Figure 1:
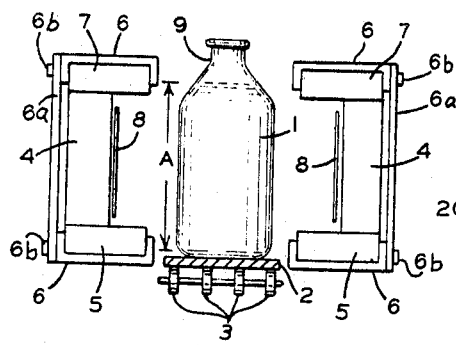

Jan. 7, 1969  N. E. HAGER, JR  3,420,982
PREVENTION OF MOISTURE CONDENSATION ON CHILLED, FILLED BOTTLES
Filed Nov. 15, 1966

INVENTOR
NATHANIEL E. HAGER, JR.
BY
ATTORNEY

United States Patent Office 3,420,982
Patented Jan. 7, 1969

3,420,982
PREVENTION OF MOISTURE CONDENSATION ON CHILLED, FILLED BOTTLES
Nathaniel E. Hager, Jr., Lancaster, Pa., assignor to Armstrong Cork Company, Lancaster, Pa., a corporation of Pennsylvania
Filed Nov. 15, 1966, Ser. No. 594,528
U.S. Cl. 219—388     2 Claims
Int. Cl. F27d 11/12

This invention relates generally to preventing moisture from condensing on the outer surfaces of chilled, filled glass containers. More particularly, the invention relates to apparatus and method for supplying sufficient heat of the proper characteristics to the proper region of chilled, filled containers to prevent such condensation.

Carbonated beverages of all kinds are normally bottled at temperatures near or below 40° F. Once the bottling operation is complete, the bottles are transported to a packaging operation where they are put up in cartons, cases, or other containers holding a plurality of the filled bottles. The filled, chilled bottles are normally conveyed to the packaging operation on a moving conveyor belt or equivalent system. Since the filled bottles are chilled to a temperature around 40° F., the bottles collect condensate on their exterior surfaces until such time as the temperature of the bottles and their contents rises to the dewpoint. Measurements have shown that 8 ounces of water can readily collect in a 24-bottle carton before the temperature of the filled bottles rises to the dewpoint. It will be appreciated that this water of condensation drips to the bottom of the carton or container and soaks and weakens the carton. In practice, large stacks of cartons or cases have collapsed in bottlers' warehouses.

The problem has been sufficiently acute that much effort has been devoted to find ways to overcome the effects of this water of condensation. Hot air, steam, hot water, and radiation have all been used to heat the filled bottles above the dew point of the air. For a variety of reasons, none of these devices is widely accepted due to high cost, large space requirements, or inability to function properly.

Perhaps the most successful method so far for raising the temperature of the bottles to the dewpoint involves use of resistance heaters such as coiled wires or straight bars for supplying radiant heat to the bottles as they move from the bottling operation to the packaging operation. Coiled resistant wires have been positioned behind a continuous sheet of metal or other suitable element in order to supply the requisite indirect heating to the bottles as they move on a conveyor belt on the way to the packaging operation. However, the breakage of the filled bottles from such heating systems has been too high to be acceptable. Additionally, when the conveying belt or other conveying means stops due to a malfunction somewhere in the line—a common occurence—the thermal inertia of such a heating system causes it to stay hot for periods of the order of minutes and could overheat the bottles and cause actual explosions of the bottles on the stopped line. It is apparent that such systems leave much to be desired. There is a need for a simple, compact, effective apparatus for supplying heat to these chilled, filled bottles without danger of breakage during normal operation or explosions when the line stops.

It is the primary object of the present invention to supply such an apparatus. It is a further object of the present invention to supply an apparatus which will economically and safely eliminate water of condensation from forming on chilled, filled bottles after the bottling operation. It is a still further object of the present invention to describe a method for accomplishing these ends.

These objects have been achieved in a surprisingly effective and straightforward manner. The invention contemplates an apparatus for heating filled, chilled glass bottles, the apparatus comprising conveying means for transporting the bottles, and insulated heating element supports positioned along each edge of the conveying means. A metallic foil heating element adapted to supply heat to the bottles on the conveying means is mounted on each of the two heating elements support. The metallic foil heating element has a width equal to the height of the body portion of the bottles to be heated. The metallic foil heating element has a heat capacity per unit length less than about 0.05 that of the filled bottles to be heated per corresponding unit of line length. A shield is positioned above each of the heaters to prevent the thermal radiation from the heaters from striking the unfilled neck portion of the filled bottles to be heated. The electrical power supply to the metallic foil heating elements must be such to maintain the temperature of the heating element in the range of 1200°–1800° F. A switch, or other cut-off means, will be part of the metallic foil heater circuitry in order to shut off the power to the heaters when the conveyor stops while transporting the filled, chilled bottles.

Figure 4:
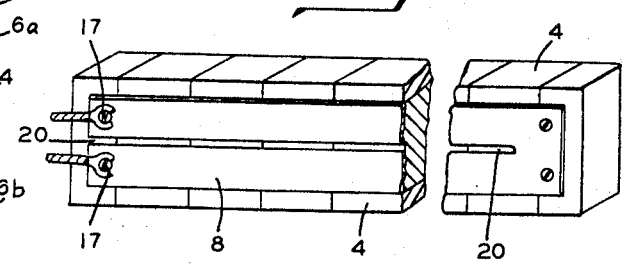
Figure 2:
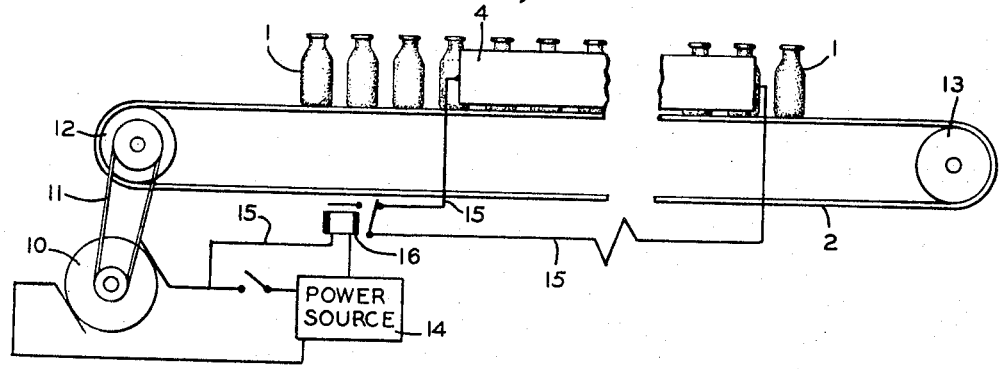
Figure 3:
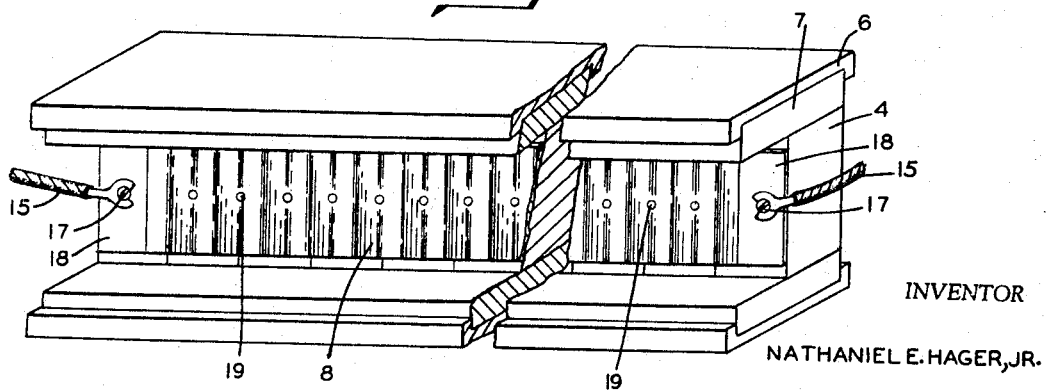

The invention will be better understood with reference to the attached drawing in which FIG. 1 represents a simplified cross section of the apparatus of the present invention position in relation to a bottle to be heated, FIG. 2 is a schematic representation showing the functioning of the apparatus, FIG. 3 is a simplified representation showing one form of the heater mounted on the heater supports, and FIG. 4 illustrates a simplified version of another form of the heater on its supports.

Referring to FIG. 1, a filled, chilled bottle 1 is positioned on a conveyor belt 2 which moves over the conveyor belt supporting rollers 3. The insulating heating element supports 4 are positioned on suitable bases 5 which in turn may be supported by a channel beam 6. Channel beam supports 6a may be held in position with bolts 6b. The insulated heating element supports 4 are preferably an insulating firebrick which may be cut or shaped to suitable size to conform to the height A of the body portion of the bottle 1. The supports 4 may be of any convenient material such as asbestos-cement compositions which will carry the required weight of the structure. They will also withstand heat and will preferably reduce heat loss out through the back of the supports in a direction away from the bottle 1 to be heated. Alternatively, the supports 4 may be a composite structure having a refractory surface backed by an insulating material such as a cellular ceramic board, a thin layer of insulating brick backed by corkboard, low density fiberboard, or other such materials.

Positioned at the top of the insulated heating element supports 4 is the shield 7. The shield 7 prevents radiation from the heater 8 from striking the unfilled neck portion 9 of the bottle 1.

It has been found that if the radiant flux levels needed to heat a filled bottle strike the unfilled neck region of the bottle, the unfilled neck region seriously overheats before the filled part of the bottle rises to the dew point. Such unequal heating is apparently the cause of much of the breakage encountered in bottles with heating systems used in the past. The position of the shields 7 is such that little or no radiation from the heater 8 strikes the unfilled neck portion 9 of the bottle 1. The shields 7 may be conveniently fabricated of the same materials as the insulated heating element supports 4. Again, channel beams 6 may conveniently be used as a support means for the shields 7. It will be noted in FIG. 1 that the bases 5 are so located to minimize the impingement of radiation on the conveyor belt itself, which may in some lines be wider than the base of the bottle.

The heater 8 must be made of a metallic foil. The foil may be of any convenient metal which will withstand the rigors of the required heating, but preferably it will be a stainless steel foil of the austenitic type, having a thickness in the range of 0.0005–0.01 inch, and preferably on the order of 0.001 inch. The heater 8 in the present apparatus must be a metallic foil for two reasons. First, the metallic foil is capable of giving a solid and uninterrupted heating surface corresponding to the height of the filled body portion A, shown in FIG. 1, of the bottle in a manner which rods, bars, and coiled resistance wires cannot do. Second, the metallic foil heater 8 has the lowest thermal inertia per unit area of any of the possible heating elements; the great significance of this low thermal inertia will be explained below.

In FIG. 2, the conveyor belt 2 is driven by the motor 10 by means of a chain or belt drive 11 which drives the conveyor belt driving wheel 12. An idler wheel 13 at the far end of the conveying belt system could be converted into a conveyor belt driving wheel if desired. The power source 14 supplies the necessary power to the motor 10. It also supplies power to the heaters by means of the power leads 15. A suitable switch or relay 16 is adapted to cut off the power to the heaters whenever the power to the conveyor motor 10 is cut off. The circuitry, then, is such that the heaters are turned off whenever the conveyor belt stops moving.

The power source 14 must supply power to the heaters 8 in order that the heaters will be maintained at a temperature in the range 1200°–1800° F. This temperature range is critical. Of the total radiant flux striking a bottle the fraction which passes through the glass wall and which acts directly on the contents of the glass bottle depends sharply on the source temperature. The hotter the source, the larger the fraction of radiation which passes through the glass to the contents. Infrared absorption data on glass and water show that most of the radiation which passes through glass is absorbed within the water film immediately inside the glass container. Hence in apparatus of the kind described herein, care must be exercised to avoid damaging the flavor of the contents of the bottle by overheating the thin film of liquid immediately inside the glass. It has been found that a temperature of at least 1200° F. is necessary in order to quickly raise the outer surface of the bottle wall to the dew point without waiting for the contents of the bottle to rise; this situation prevents water condensation on the surface of the chilled, filled glass bottle in the early stages of travel through the apparatus of the present invention. At the same time, it is necessary to limit the maximum temperature to about 1800° F. in order not to overheat the film of liquid immediately inside the glass container.

As mentioned earlier, it is a common occurrence in bottling lines of the type described to have stoppages occur for any of a variety of reasons. A stoppage anywhere along the line is likely to cause a stoppage of the conveyor belt which is part of the present invention. In such event, it is usually not enough simply to turn off the power to the heaters where the heaters are of the type previously used. The thermal inertia of the rods, bars, and coiled resistance wires is such that the stopped bottles are likely to continue to be heated to a point where there is flavor loss or explosion. It has been found that the heat capacity of the heating system per unit of line length must be less than 0.05 times the heat capacity per unit of line length of the filled bottles being heated in order to avoid threat of flavor loss or explosion when the line stops and the power to the heaters is turned off. The metallic foil heating elements described as part of the present invention admirably fulfill this requirement. Even where small bottles are to be heated to prevent water condensation, the thermal inertia of the heating element is still sufficiently small, and will still meet this heat capacity limitation.

It is a feature of the present invention that the apparatus will function as described whether the glass bottles are made of clear glass or colored glass. The usual colored glasses behave much the same as clear glass in the spectral region at which the heaters of the present invention radiate. The preferred temperature of 1500° F. at which the heating element will normally be maintained may be varied between the limits of 1200°–1800° F. depending on the color of the glass.

Referring to FIG. 3, the heating element supports 4 carry the heater 8, which in this embodiment, constitutes a single broad strip of metallic foil which is corrugated to aid and to compensate for the expansion and contraction of the heater 8 as it heats and cools. Electrical connections 17 are shown positioned at the ends of the heater 8 serving to connect the power leads 15 to the heater 8. The terminal portions 18 of the heater 8 may have deposited thereon a coating of silver in order to make the foil thicker at those regions and avoid the formation of any hot spots in the neighborhood of the terminal 17. Tabs of heavier foil may be spot welded to ends of foil strips to accomplish the same result. Steel nails or other suitable fasteners 19 may conveniently be used to hold the heater 8 to the heating element supports 4 in this modification.

Referring to FIG. 4, the heater 8 positioned on the heating element supports 4 has a different configuration in that the slot 20 cut in the metallic foil of the heater 8 establishes a serpentine configuration and thus allows the electrical terminals 17 both to be positioned at the same end. The width of the slot 20 is sufficiently narrow, being on the order of an eighth inch or less, that the heater 8 nevertheless functions as if it were a solid radiant surface.

I claim:
1. Apparatus for heating filled, chilled glass bottles which comprises conveying means for transporting bottles, insulated heating element supports positioned along each edge of said conveying means, a metallic foil heating element adapted to supply heat to bottles on said conveying means mounted on each of said supports and having a width equal to the height of the body portion of the bottles to be heated, said heating elements having a heat capacity per unit of line length less than about 0.05 that of the filled bottles to be heated, a shield positioned above each said heating element to prevent thermal radiation from said heater from striking the unfilled neck portion of the filled bottles to be heated, electrical power supply means for maintaining the temperature of said heating elements in the range 1200°–1800° F., and cut-off means for shutting off the power to said heating elements when said conveying means stops.

2. Apparatus according to claim 1 wherein said metallic foil heating elements comprise stainless steel foil.

References Cited
UNITED STATES PATENTS

| | | | |
|---|---|---|---|
| 2,355,459 | 8/1944 | Miskella | 34—105 |
| 2,682,596 | 6/1954 | Cox et al. | 338—314 X |
| 2,897,082 | 7/1959 | Kaiser | 141—82 X |
| 3,038,986 | 6/1962 | Molitor | 219—387 |
| 3,121,520 | 2/1964 | Gann | 34—105 X |

BERNARD A. GILHEANY, *Primary Examiner.*

R. N. ENVALL, JR., *Assistant Examiner.*

U.S. Cl. X.R.

34—105; 141—82